L. HECKMANN.
Ear-Ring.

No. 216,954. Patented July 1, 1879.

WITNESSES.
D. W. Williams.
John E. Frenning.

INVENTOR.
Louis Heckmann.
By his Attys.
Henry W. Williams & Bro.

UNITED STATES PATENT OFFICE.

LOUIS HECKMANN, OF WRENTHAM, MASS., ASSIGNOR OF TWO-THIRDS HIS RIGHT TO WM. H. WADE AND EDWARD P. DAVIS, OF SAME PLACE.

IMPROVEMENT IN EAR-RINGS.

Specification forming part of Letters Patent No. 216,954, dated July 1, 1879; application filed May 1, 1879.

*To all whom it may concern:*

Be it known that I, LOUIS HECKMANN, of Wrentham, in the county of Norfolk and State of Massachusetts, have invented a new and useful Improvement in Ear-Drops, of which the following is a specification.

This device, although intended primarily to be applied to ear-drops, is also useful in connection with buttons and studs; and I propose to apply it to all three of the said articles— viz., ear-drops, buttons, and studs.

As applied to ear-drops, it is intended to take the place of those which screw into the ear and are fastened by a nut upon the back side, the objections to which are, principally, that they cause pain while being inserted in the ear, and that when made in plate (plated in the ingot) the plate on the screw is necessarily removed in cutting the thread, and the composition thus exposed produces soreness in the ear. The thread also soon wears out, and the nut is useless in holding the ear-drop in the ear. These objections are obviated by means of my improvement.

There are other advantages possessed by it, which will be made apparent in the description.

Figure 1:
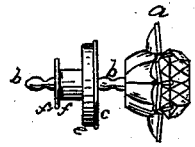
Figure 2:
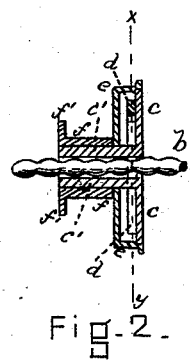
Figure 3:
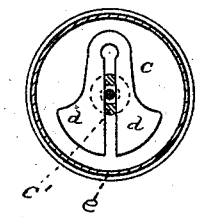
Figure 4:
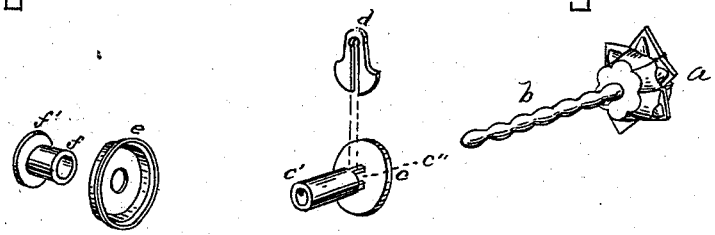

In the accompanying drawings, in which similar letters of reference indicate like parts, Figure 1 is a side view of an ear-drop embodying my invention. Fig. 2 is a longitudinal section of the same with the drop removed. Fig. 3 is a section upon broken line $x\ y$, Fig. 2. Fig. 4 is a view of the ear-drop separated into its parts.

$a$ is the drop or ornamental portion of the ear-drop, provided with a beaded stem, $b$, in place of the screw now in use. $c$ is a plate or disk having an opening for the admission of the stem $b$, and having a hollow post, $c'$, which is notched or cut away on both sides at $c''$, so that the U-spring $d$ lies in said notches and embraces the beaded stem $b$ between the beads. $e$ is a cover placed around the post $c'$ and upon the plate $c$, burnished or soldered thereto, and hiding the spring. $f$ is a tube placed over the post $c'$, against the cover $e$, and having a flange, $f'$.

To apply the device, remove nut or securing portion $f'\ f\ e\ c$, and, after passing the stem $b$ through the ear, apply the nut, pressing it over the stem until the plate $c$ reaches the back of the ear. The spring $d$ will clamp the stem between two of the beads, and the ear-drop will be secure.

It will be seen that the nut fastens in any position, according to the thickness of the ear; that there is no laceration of the ear; no necessity of cutting away the plate, if the stem be plated; that the end of the stem, being blunt, cannot hurt the flesh when the wearer is lying down; that there are no threads to wear out, and that, whether the device be used as a button, stud, or ear-drop, it is firm and secure in any position, accommodating itself to the thickness of the ear or of the garment.

The U-spring $d$ may be of flat metal or wire, as desired.

Having thus fully described my invention, what I claim, and desire to secure by Letters Patent, is—

1. The combination, with the beaded stem $b$, of the U-spring $d$, said spring being adapted to embrace the post $c'$, made hollow and provided with one or more notches or openings, $c''$, for the purpose of allowing the spring to press said stem between the beads, substantially as and for the purposes herein set forth.

2. The combination of the beaded stem $b$, plate $c$, having hollow post $c'\ c''$ attached, spring $d$, cover $e$, and tube $f f'$, all combined and arranged substantially as and for the purpose above described.

LOUIS HECKMANN.

Witnesses:
 FRANK I. BARDEN,
 SUSAN E. BARDEN.